(12) United States Patent
Vidrio Borrego et al.

(10) Patent No.: US 11,186,442 B2
(45) Date of Patent: Nov. 30, 2021

(54) DEVICE FOR THE DRY CLEANING AND SANITIZATION OF FLAT SANITARY CONVEYOR BELTS

(71) Applicant: CLEVOT, S.A. DE C.V., Zapopan (MX)

(72) Inventors: Juan de Dios Vidrio Borrego, Zapopan (MX); Jorge Luis Gudiño Casillas, Zapopan (MX); Aldo Sainz Hernandez, Zapopan (MX)

(73) Assignee: CLEVOT, S.A. DE C.V., Jalisco (MX)

( * ) Notice: Subject to any disclaimer, the term of this patent is extended or adjusted under 35 U.S.C. 154(b) by 0 days.

(21) Appl. No.: 16/976,553

(22) PCT Filed: Feb. 27, 2019

(86) PCT No.: PCT/MX2019/000022
§ 371 (c)(1),
(2) Date: Aug. 28, 2020

(87) PCT Pub. No.: WO2019/168395
PCT Pub. Date: Sep. 6, 2019

(65) Prior Publication Data
US 2020/0407172 A1 Dec. 31, 2020

(30) Foreign Application Priority Data
Feb. 28, 2018 (MX) .................. MX/a/2018/002563

(51) Int. Cl.
*B65G 45/24* (2006.01)
*B65G 45/12* (2006.01)
(Continued)

(52) U.S. Cl.
CPC ............. *B65G 45/24* (2013.01); *B65G 45/12* (2013.01); *B65G 45/22* (2013.01); *B65G 45/26* (2013.01)

(58) Field of Classification Search
CPC ........ B65G 45/24; B65G 45/12; B65G 45/22; B65G 45/26
See application file for complete search history.

(56) References Cited

U.S. PATENT DOCUMENTS

| 5,355,992 A | * | 10/1994 | Baig | ...................... B65G 45/22 |
| | | | | 198/495 |
| 6,135,276 A | | 10/2000 | French et al. | |

(Continued)

FOREIGN PATENT DOCUMENTS

| EP | 1964794 A2 | * | 9/2008 | ............. B65G 45/24 |
| GB | 2392826 A | | 3/2004 | |

(Continued)

OTHER PUBLICATIONS

Amerivap Houdini, Polar Global, Oct. 5, 2008, URL: http://www.polar-global.com/cleaning.html.

(Continued)

*Primary Examiner* — Mark A Deuble
(74) *Attorney, Agent, or Firm* — Alan F. Feeney; Perry + Currier Inc.

(57) ABSTRACT

The invention relates to a head-type device for continuous cleaning and sanitization in conveyor belts, mainly flat sanitary conveyor belts. The head-type device comprises a profile extruded as a single piece that defines the length of the cleaning area and comprises a W-shaped cross section, containing, longitudinally, a plurality of polymer scrapers, a pair of polymer seals being disposed on the left and right ends of said W-shaped extended profile, wherein said pair of seals is also protected and sealed by a pair of polymer caps that limit the length of the extended profile.

11 Claims, 7 Drawing Sheets

(51) Int. Cl.
    *B65G 45/22*   (2006.01)
    *B65G 45/26*   (2006.01)

(56) References Cited

U.S. PATENT DOCUMENTS

| | | | |
|---|---|---|---|
| 9,096,392 | B1 | 8/2015 | Barragan |
| 9,248,975 | B2 * | 2/2016 | Handy .................. B65G 45/18 |
| 10,046,920 | B1 * | 8/2018 | Green ..................... B08B 3/041 |
| 10,266,348 | B1 * | 4/2019 | Yoo ........................ B65G 45/12 |
| 2003/0041880 | A1 * | 3/2003 | Udall ...................... A47L 11/34 |
| | | | 134/9 |
| 2019/0344973 | A1 * | 11/2019 | Rogan ................... B65G 45/22 |

FOREIGN PATENT DOCUMENTS

| | | |
|---|---|---|
| WO | WO-0168276 A1 | 9/2001 |
| WO | WO-03057378 A1 | 7/2003 |
| WO | WO-2011114730 A1 | 9/2011 |
| WO | WO-2017046165 A1 | 3/2017 |

OTHER PUBLICATIONS

Dupray. "Conveyor Belt Cleaning System in Food Factory—Dupray Steam Cleaners". YouTube, Dec. 20, 2013, URL: https://www.youtube.com/watch?v=hQyaN7Pk_-Q.

Amerivap Houdini "Jet Spinner Cleaning Mesh Conveyor Belt Using Dry Steam Vapor". YouTube, Feb. 2, 2017, URL:https://www.youtube.com/watch?v=pUy5kyl9baU.

* cited by examiner

DEVICE FOR THE DRY CLEANING AND SANITIZATION OF FLAT SANITARY CONVEYOR BELTS

CROSS REFERENCE TO RELATED APPLICATIONS

This application is a continuation under 35 U.S.C. § 371 of International Application No. PCT/MX2019/000022 filed on Feb. 27, 2019, which claims priority to Mexican Patent Application Ser. No. MX/a/2018/002563 filed Feb. 28, 2018, which is hereby incorporated by reference herein in its entirety.

FIELD OF THE INVENTION

The present invention refers to a head-type device for cleaning and sanitizing conveyor belts, and in particular flat sanitary type belts. Furthermore, the invention relates to a head-type device that comprises a double chamber that injects dry steam and pumps out steam, condensate and waste for cleaning and sanitizing sanitary conveyor belts.

BACKGROUND OF THE INVENTION

Hygiene and food safety of raw materials and final products are essential in the food industry, therefore choosing the cleaning method that best suits your operation depends on a series of options that include the nature of the surface to be cleaned and the type of material or waste found in the different conveyors. In an exhaustive search to solve cleaning problems, cleaning benefits have been found using a continuous steam system that provides a constant amount of steam, which can be adjusted through volume and dryness. The water flow and the heat level can be controlled and adapted through a manual or electronic control system.

Dry steam sanitizes surfaces, penetrates cracks, surface pores and other hard-to-reach areas, unlike manual and additional cleaning methods, which use potentially dangerous chemicals as they may or may not meet the required standards. With steam, no additional ingredients are required to improve the cleaning power, since the cleaning capacity is produced from the steam flow that is placed on the surface to be cleaned, the dissolving power of the microdroplets at high temperatures and at a minimum moisture. Technology has developed a wide range of dry steam engines for different applications, based on many years of experience in creating tailor-made steam solutions.

The proof is that devices have been designed that adapt to machines that have conveyor belt cleaning systems, which can be used with a wide range of conveyor belt sizes, among which we can mention the one described in U.S. Pat. No. 9,096,392, which discloses and teaches a conveyor belt cleaning steam device for cleaning a continuous conveyor belt that includes a housing attached to a conveyor belt support and a steam blasting unit arranged below the housing.

Yet another device is found in the international application WO2011/114730, which relates to an apparatus with an injection unit adapted to inject a pressurized steam jet eventually to a work surface without dropping the temperature of the pressurized steam jet.

Finally, there is a device identified as Houdini (The AmeriVap® Systems) which aims to give greater efficiency to the cleaning of conveyor belts, and comprises a steam injection rail, a stainless steel cover and a highly inefficient suction rail, which are intended to facilitate cleaning in flat sanitary conveyors.

However, the aforementioned devices comprise components that do not allow a hermetic seal, which generates condensate runoff from all sides, in addition to allowing steam to escape into the environment on a constant basis and, therefore, higher capacity dry steam systems are required, thus presenting many problems for their assembly on the conveyor belts and being complicated to use.

Another problem that the aforementioned devices present is that they have limitations to work on belts with a maximum width of up to 1 meter, without being able to have an extension greater than one (1) meter, since in conveyors greater than one (1) meter, the device bends in the central part of the rails, which causes the cleaning to not be carried out in a uniform manner across the width of the conveyor belt and certain humidity to escape on occasions.

For this reason, the present invention has developed a head-type device that mitigates all the problems and limitations mentioned above, and is described as indicated below.

SUMMARY OF THE INVENTION

The invention relates to a head-type device for continuous cleaning and sanitization on conveyor belts, mainly of the flat sanitary type. The head-type device comprises an extruded profile in a single piece that defines the length of the cleaning area, which comprises a W-shaped cross-section which longitudinally houses a plurality of polymer scrapers, and a pair of polymer seals are arranged at each of their ends, right and left, of said W-shaped extruded profile, where in addition said pair of seals are protected and sealed by a pair of polymer caps that limit the length of the extruded profile.

In one embodiment of the present invention, the head-type device can be mounted on a computer equipment to complement its operation, through a plate with a smooth and flat surface placed below and transversely to the movement path of the conveyor belt. The assembly of the plate is carried out in the structure of the conveyor, which varies between applications, and the plate may or may not make contact with the belt that circulates through the head.

In another embodiment, when the device is mounted onto a piece of equipment, it is connected to a dry steam line through a pair of smaller diameter holes as the only input and is mounted under the sanitary conveyor belts to clean them during their trajectory and without the need to stop the production carried out in the upper part of the belt. Likewise, there is a larger diameter hole which runs through the profile longitudinally, which is connected to a suction system, which allows the extraction of all the waste, the excess steam and condensate generated by the work carried out.

Due to the characteristics of the device, it allows working with very little water, thus achieving that the conveyor belt comes out clean, dry and sanitized. The device is mounted on the equipment which is placed on the structure of the conveyor, and the positioning of the device for rest or maintenance work is dictated by the equipment, and can be manual, semi-automatic or automatic.

DESCRIPTION OF THE FIGURES

The present invention will be further explained with reference to the figures of the drawings listed below, wherein through various views, references are made structurally by means of numerals.

While the figures of the drawings identified above establish various modalities of the invention, other modalities are also contemplated as noted in the arguments. In all cases, this description presents the current invention by way of representation and not limitation.

DETAILED DESCRIPTION OF THE INVENTION

Figure 1:
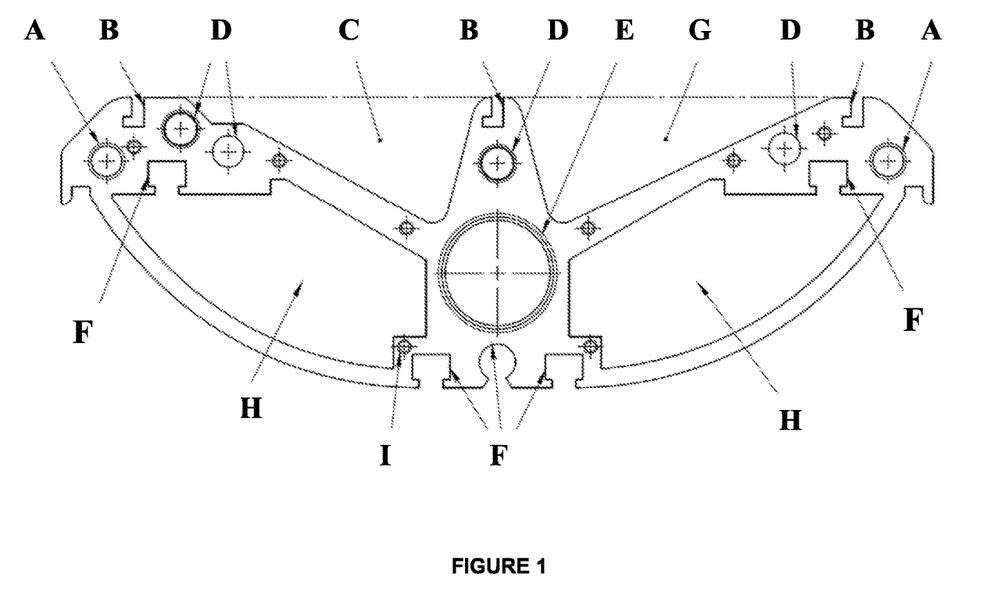
FIG. 1 shows a front elevation view of the extruded W-shaped profile of the head device.
Figure 3:
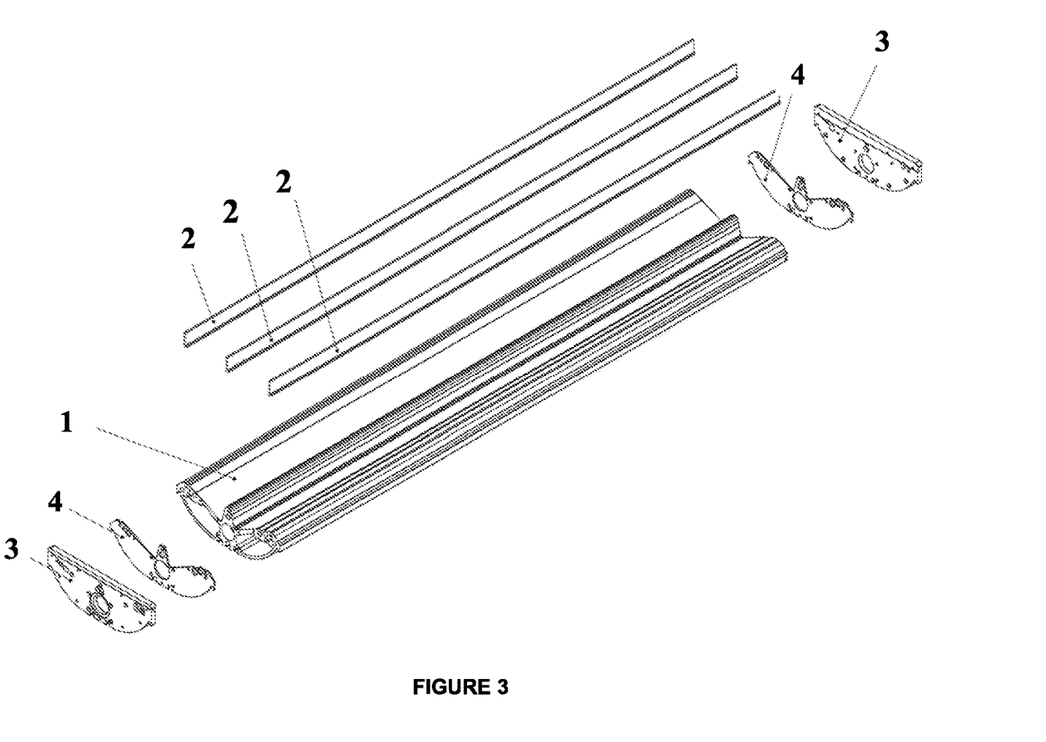
FIG. 3 shows an exploded perspective view of the main components of the head-type device.

In accordance with what is shown in FIGS. 1 and 3, a head-type device that comprises a W-shaped extruded profile (1) which defines the length of the belt width to be cleaned, where a plurality of scrapers (2) that make contact with the conveyor belt are arranged in each upper slope of the "W" profile. Together, a pair of joints (4) and caps (3) with a cross section similar to the extruded profile (1), are found at the left and right lateral ends that serve as total or partial lateral seals, as well as supports of the W-shaped extruded profile (1) of FIGS. 1 and 3.

Figure 2:
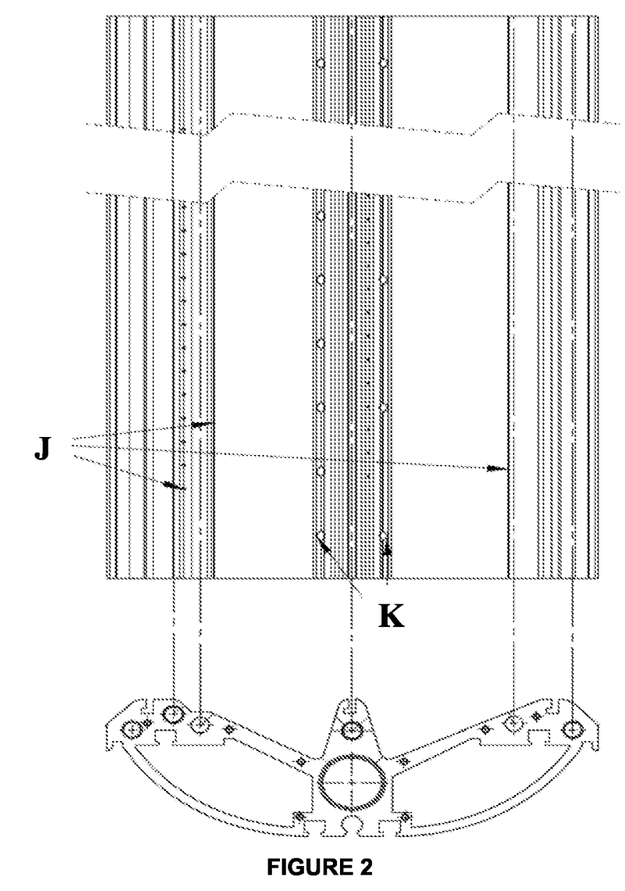
FIG. 2 shows a projection view of the channels of the "W" profile that corresponds to the polymer seal of the extruded profile of the head device.

FIGS. 1 and 2 show the details of the W-shaped extruded profile (1), where each of its lower central slopes forms two compartments that house a pair of heating and cleaning chambers (G), which receive the removed product and runoff from the surface of the belt reaching a plurality of perforations (K) connected in turn to a channel (E) for suction of solids and fluid which functions as a collector of accumulated dirt.

Additionally, in the upper part of the two slopes of the W-shaped extruded profile (1), a pair of internal channels (D) for dry steam connection are continuously arranged, with the option of using the 4 channels, which are projected longitudinally along the head, and in turn communicate with the surface through a plurality of perforations (J) through which the dry steam is transported and injected uniformly, where said quantity of perforations are located and adapted according to the type of dirt that needs to be removed.

In the same upper part of the two slopes of the extruded profile (1) in the shape of a 'W,' there is a plurality of channels (B) configured to receive a plurality of scrapers (2) that are designed to provide a sweeping effect of the material that needs to be removed from the conveyor belt, continuously having a pair of circular channels (A) that are designed to couple a head holder.

In a preferred embodiment, the W-shaped extruded profile (1) comprises, in its lower central part, a plurality of notch-type geometries (F) and (I) that serve for the direct mounting and dismounting of the head-type device on a conveyor structure (not shown) in a versatile and ergonomic way, allowing it to operate automatically or semi-automatically.

Figure 4:
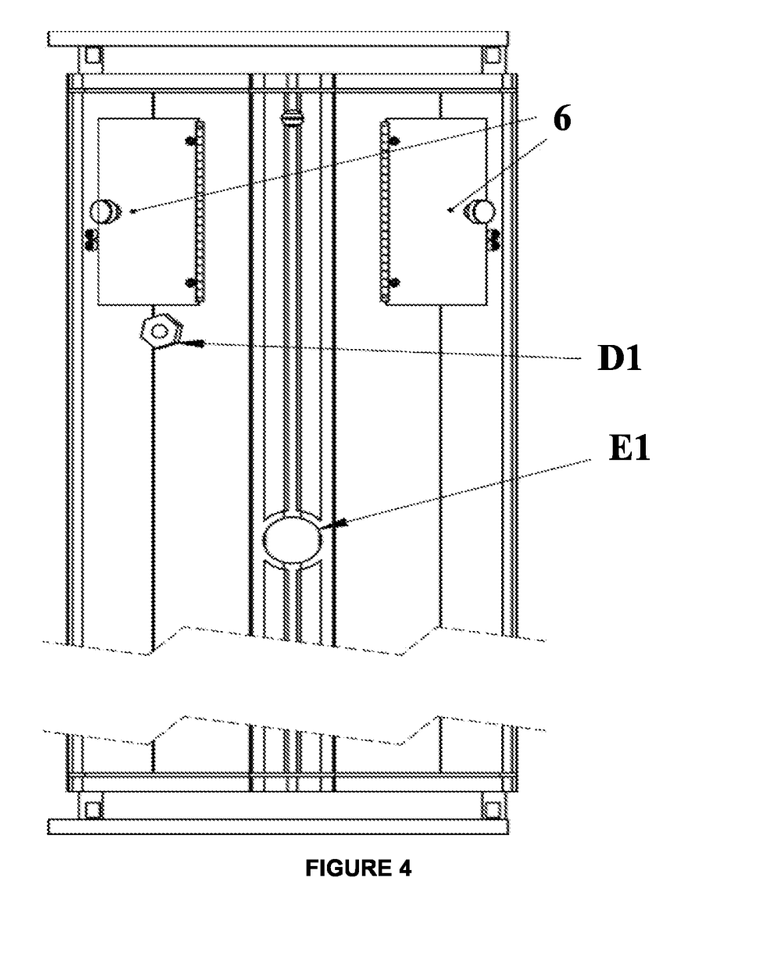
FIG. 4 shows a bottom view of a sectional section of the gates and additional connections of the head-type device.
Figure 5:
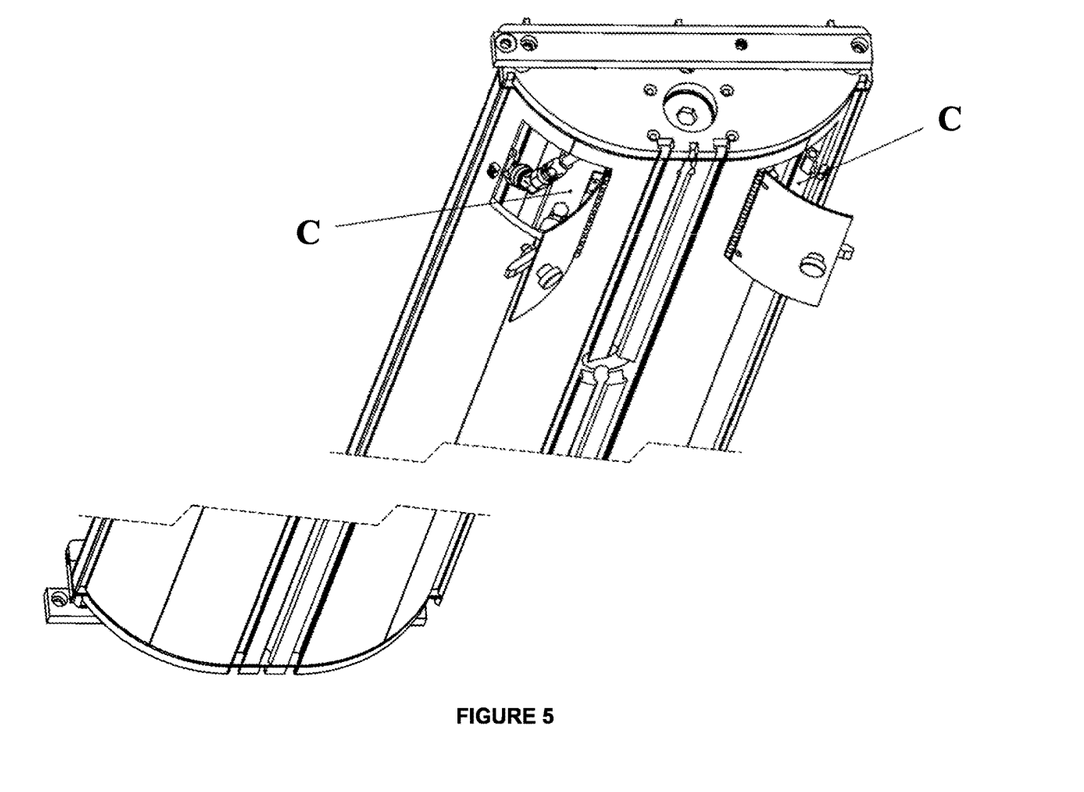
FIG. 5 shows a view of a sectional section of the extruded profile with an interior detail of the gates of the head-type device.

According to what is shown in FIGS. 4 and 5, an embodiment of the W-shaped extruded profile (1) is shown comprising at an internal end a window-like cavity (C) where it houses a plurality of hoses that transport the steam, where said hoses are accessed through a pair of lateral gates (6) that serve as caps, thus allowing easy access to provide maintenance or service to these hoses.

Figure 6:
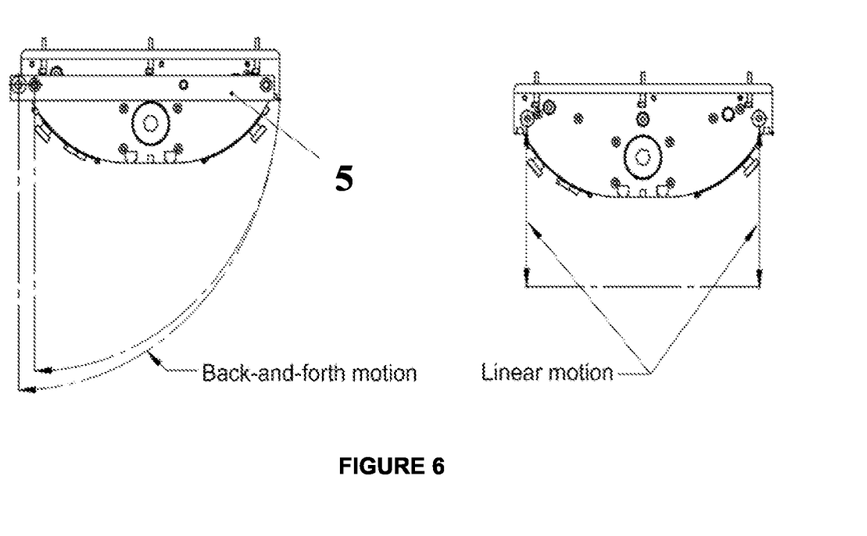
FIG. 6 shows a right and left side view of the extruded profile of the head device limited in both cases by the polymers that delimit the device on each side and allow it to be leak-proof.

In a more preferred embodiment and according to FIG. 6, the W-shaped extruded profile (1) is designed to allow an easy partial or total assembly and disassembly, which allows a clamping shaft (5) to be coupled by means of the pair of channels (A) to allow said extruded profile to hang down and perform a reciprocating movement and thus be released downwards to be able to clean the hard-to-reach areas. Likewise, a linear movement is also possible to immobilize the head device and achieve partial assembly and disassembly.

Assembly and Operation of the Head-Type Device

Figure 7:
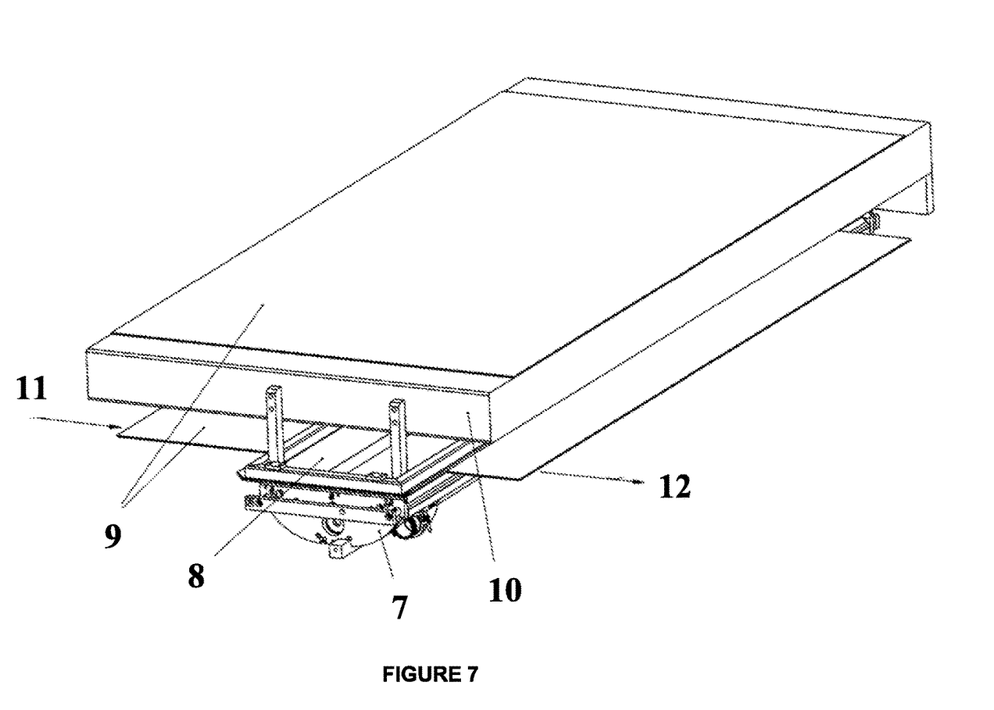
FIG. 7 shows a perspective of the head-type device mounted on an equipment with a conveyor belt.

The device receives the contaminated belt (9) through the inlet (11) and delivers a clean, dry and sanitized belt through the outlet (12).

When entering the belt through the inlet (11), it may or may not make contact with the first line of scrapers (2); when making physical contact, the sweeper detaches the external dirt layer adhered to the belt, where the dimensions and hardness of the scrapers (2) are selected according to the cleaning needs.

Once the moving belt passes the first sweeper, it reaches the area of the first chamber (G) of the head, where the dry steam applied by the steam generator to the channels (D) is encapsulated, which have a plurality of perforations (J) directed to the surface of the belt. This creates a temperature higher than 80° C. inside the chamber (G), and by causing a drastic change in temperature on the surface of the belt (9), a thermal shock of more than 60° C. is generated thereon, which breaks the adherence of the most difficult and less superficial layers of product and/or dirt on the belt, and, at the same time, germs and bacteria are eliminated and the surface is disinfected thanks to a thermal method instead of a chemical one.

Immediately after this, the belt makes physical contact with a second sweeper, which helps to detach the layer of dirt that has been weakened by the first chamber (G), where later all the detached residues are directed to the lower part of the first chamber (G) where there is a plurality of perforations (K) that are connected to the channel (E), which, by means of a pressure difference, pumps out the waste and/or steam contained in the first chamber. To that end, the equipment consists of a suction system which is connected to the device (7) in the channel (E), which gives the device (7) the ability to remove the dirt residues from the belt, whether solids or fluids, as well as the excess steam and the little water condensate generated, all this with the help of the seal (4) and/or the cap (3) and the vacuum generated by the suction system.

After the belt passes the second sweeper, it enters the second cleaning chamber (G), under conditions similar to those of the first chamber (G), where the dry steam is encapsulated and applied by the steam generator to the channels (D) which are connected to a plurality of perforations (J) directed to the surface of the belt, breaking the adherence of the following less superficial layers of product and/or dirt on the belt to eliminate germs and bacteria and disinfect the surface by means of a thermal method instead of a chemical one.

Immediately after this, the belt makes physical contact with the third sweeper, which helps to detach the layer of dirt that has been weakened by the second chamber, so that later all the detached residues and/or steam are directed to the lower part of the second chamber (G) where there are a plurality of perforations (K) that connect with the channel (E) and where, by means of a pressure difference, the residues contained in the second chamber are pumped out. At the end of this process, the device delivers a clean, dry and sanitized belt through the outlet (12).

A variant to the steam connection consists in that it can be made directly in the channels (D) and/or by machining the profile to make a transverse connection with the channels (D) and apply steam to the lower part (D1, FIG. IV).

A variant of the suction channel is that it can be connected directly with a connector that is assembled in the channel (E) or by machining the profile (FIG. 1) in the position (E1) and thus place a connector that is linked to the channel (E).

We claim:

1. A head device for the continuous cleaning and sanitization of a flat conveyor belt having a defined length and width and an upper and a lower surface, comprising:
    a W-shaped extruded profile, which having two upper slopes and two lower slopes, that defines the length and the width of the flat conveyor belt intended to be cleaned with the device;
    a plurality of scrapers arranged in each upper slope of the W-shaped extruded profile, wherein the plurality of scrapers make contact with the flat conveyor belt that is being cleaned;
    two compartments, formed in each of the central lower slopes of the W-shaped extruded profile, designed to house a pair of heating and cleaning chambers, wherein the compartments are configured to receive solids and runoff fluids from a surface of the flat conveyor belt as the belt is being scraped by the plurality of scrapers when the belt is being cleaned by the device;
    a channel, connected to the two compartments, designed to suction off the solids and fluids created by the plurality of scrapers as the flat conveyor belt is being cleaned, wherein the channel is configured to collect the solids and fluids created by the plurality of scrapers as the flat conveyor belt as the belt is being cleaned that accumulate during cleaning;
    a pair of internal dry steam connection channels designed to accept and deliver encapsulated dry steam from a steam generator connected to the pair of internal dry steam connection channels, wherein the pair of internal dry steam connection channels are arranged in the upper sections of the two upper slopes of the W-shaped extruded profile that are projected longitudinally along the device, wherein the pair of internal dry steam connection channels communicate with a surface of the flat conveyor belt as the belt is being cleaned using a plurality of perforations through which the dry steam from the steam generator is transported and injected by the pair of internal dry steam connection channels in a uniform manner, wherein said plurality of perforations may be relocated and/or adapted to the type of solids and liquids needed to be removed from the flat conveyor belt as the belt is being cleaned;
    a plurality of channels configured to receive a plurality of scrapers designed to provide a sweeping effect to remove the solids and liquids from the flat conveyor belt as the belt is being cleaned;
    a pair of channels designed to couple a head holder; and
    a pair of gaskets and caps with a cross section similar to the W-shaped extruded profile situated at the left and right lateral ends of the device, wherein said pair of gaskets and caps create total or partial lateral seals; and further wherein said pair of gaskets and caps as support the W-shaped extruded profile.

2. The device according to claim 1, further comprising fastening points that allow the device to be used manually.

3. The device according to claim 1, further comprising a plate with having a smooth and flat surface;
    wherein said plate is situated below the flat conveyor belt as the belt is being cleaned and sanitized;
    wherein said plate is positioned transversely to the movement path of the flat conveyor belt as said belt is being cleaned and sanitized; and further
    wherein said plate encapsulates a section of belt to be cleaned and sanitized.

4. The device according to claim 1, further comprising:
    three polymer scrapers attached to the two upper slopes of the W-shaped extruded profile arranged transversely to the flat conveyor belt to be cleaned and sanitized.

5. The device according to claim 1, further comprising a pair of rails situated at the lower part of the device, designed as a fastening point allowing for the attachment of handles and/or other features in the future to the device.

6. The device according to claim 1, wherein the W-shaped extruded profile further comprises a cavity housing a plurality of hoses designed to transport encapsulated steam from a steam generator connected to the pair of internal dry steam connection channels and a pair of lateral gates that serve as caps allowing access to said hoses.

7. The device according to claim 1, wherein the W-shaped extruded profile is coupled to a clamping shaft by means of a pair of channels allowing the W-shaped extruded profile hangs downward, wherein said hanging W-shaped extruded profile is capable of being released downwards and rocked back and forth in order to clean hard-to-reach areas of the flat conveyor belt when the belt is being cleaned and sanitized.

8. The device according to claim 1, wherein the W-shaped extruded profile is coupled to a clamping shaft by means of the pair of channels designed to couple a head holder.

9. The device according to claim 2, further comprising a pneumatic system connected to the fastening points of the device that allows the device to be used automatically.

10. The device according to claim 4, further comprising a pair of polymer seals and/or a pair of polymer caps, wherein the three polymer scrapes and the pair of polymer seals and/or pair of polymer caps create a seal between the device and the flat conveyor belt as the belt is being cleaned and sanitized.

11. A process for dry cleaning and sanitizing flat sanitary conveyor belts wherein said belts have a top and a bottom surface, by means of a head device, comprising the steps of:
    receiving a contaminated flat sanitary conveyor belt through an inlet in a first chamber having an interior space and an upper and a lower section, wherein said flat sanitary conveyor belt is contaminated with product selected from the group consisting of dirt, waste, bacteria, germs, and further wherein the lower section of the container contains a plurality of perforations;
    passing a first sweeper over a surface of the contaminated flat sanitary conveyor belt to remove superficial product on the surface of the belt;

partially or completely contacting the contaminated flat sanitary conveyor belt contained in the first chamber with a plurality of scrapers;

using said plurality of scrapers to detach any external layers of dirt and/or waste adhered to the contaminated flat sanitary conveyor belt;

using one or more channels, having a plurality of perforations, wherein said one or more channels engage said chamber to direct dry steam from a steam generator connected to said channels to a surface of the contaminated flat sanitary conveyor belt;

continuing to direct said dry steam into the interior space of the first chamber until the interior space of the first chamber reaches a temperature greater than 80° C., wherein said increased temperature in the interior of the first chamber drastically increases the temperature of the surface of the contaminated flat sanitary conveyor belt;

directing additional dry steam to create a thermal shock of more than 60° C. to break the the most difficult layers of dirt and waste adhered to a surface of the contaminated flat sanitary conveyor belt and, at the same time, eliminating germs and bacteria, thereby disinfecting the surface of the contaminated flat sanitary conveyor belt;

receiving the partially cleaned flat sanitary conveyor belt through an inlet in a second chamber having an interior space and an upper and a lower section;

passing a second sweeper over the partially-cleaned flat sanitary conveyor belt in the second chamber to detach any remaining layers of dirt and/or waste weakened by the first chamber but still adhered to a surface of the flat sanitary conveyor belt;

directing any detached dirt and/or waste to the lower section of the first chamber, wherein the plurality of perforations contained in the lower section of the first chamber are connected to a channel, connected to a suction system having, at a minimum, a seal and/or cover and a vacuum that creates a pressure difference in the first chamber to pump the detached dirt and/or fluid waste and/or excess, residual steam and/or condensation contained in the first chamber out of said first chamber;

passing a third sweeper over the partially-cleaned flat sanitary conveyor belt to detach any residual layers of dirt or waste that were weakened by the steps undertaken in the second chamber;

directing any detached dirt and/or waste and/or excess steam to the lower section of the second chamber containing a plurality of perforations connected to the channel that is connected to the suction system having, at a minimum, a seal and/or cover and a vacuum creating a pressure difference that pumps out the detached dirt and/or waster and/or excess steam contained in the second chamber, ejecting a clean, dry and sanitized flat sanitary conveyor belt out of the second chamber through an outlet.

\* \* \* \* \*